United States Patent [19]

Purvis et al.

[11] Patent Number: 4,678,010

[45] Date of Patent: Jul. 7, 1987

[54] ACCUMULATOR FOR AIRLESS SPRAYING APPARATUS

[75] Inventors: Gene Purvis, 7704 Grensted, Lawton, Okla. 73505; Russell Phelps, 106 N. 6th St.; Tim Dupler, 2100 S. 4th St., both of Lawton, Okla. 73501; Patrick Landoll, Elgin; Leonard Landoll, Lawton, both of Okla.

[73] Assignees: Gene Purvis; Russell Phelps; Tim Dupler, all of Lawton, Okla.

[21] Appl. No.: 704,521

[22] Filed: Feb. 22, 1985

[51] Int. Cl.$^4$ .............................................. F16L 55/04

[52] U.S. Cl. ........................................ 138/31; 92/174; 277/3

[58] Field of Search .................... 138/31; 92/159, 160, 92/158, 174; 277/3, 74; 239/322, 321

[56] References Cited

U.S. PATENT DOCUMENTS

| | | | |
|---|---|---|---|
| 1,579,409 | 4/1926 | Smith | 92/159 |
| 2,211,456 | 8/1940 | Caldwell | 92/174 |
| 2,683,467 | 7/1954 | Greer | 138/31 |
| 3,321,110 | 5/1967 | Price | 92/174 |
| 3,467,140 | 9/1969 | Hanson | 138/31 |
| 3,613,734 | 10/1971 | Elmer | 138/31 |
| 3,863,677 | 2/1975 | Tarsha | 138/31 |
| 4,050,360 | 9/1977 | Powers et al. | 92/160 |
| 4,093,123 | 6/1978 | Maran . | |
| 4,474,106 | 10/1984 | Durenec | 277/3 |

FOREIGN PATENT DOCUMENTS

| | | | |
|---|---|---|---|
| 515967 | 12/1939 | United Kingdom | 92/174 |

*Primary Examiner*—Stephen Marcus
*Assistant Examiner*—Leo James Peters
*Attorney, Agent, or Firm*—Schwartz, Jeffery, Schwaab, Mack, Blumenthal & Evans

[57] ABSTRACT

A gas-liquid piston accumulator having improved piston lubrication by providing a plurality of blind hole lubricating passages around the periphery of the piston.

4 Claims, 7 Drawing Figures

ACCUMULATOR FOR AIRLESS SPRAYING APPARATUS

BACKGROUND OF THE INVENTION

1. Field of the Invention

The present invention relates to an accumulator for an airless spraying apparatus, and in particular to an accumulator for a compact, transportable or portable airless spraying system which is capable of producing superior results with ultra low volumes of paint or other liquid to be sprayed.

2. Description of the Prior Art

It has been proposed before to use an accumulator as part of an airless spraying system. The accumulator includes a pressure vessel with a slideable piston in the vessel. On one side of the piston is an expansible chamber which receives the paint or other liquid to be sprayed under pressure. The piston moves to the rear of the accumulator and the chamber expands as it is charged with pressurized paint or other liquid. On the other side of the piston is an energy storing section which may take the form of nitrogen gas under pressure. The energy storing section containing the nitrogen gas contracts as the piston moves to the rear of the accumulator, further compressing the nitrogen gas and thus storing energy for effecting a smooth and complete discharge of liquid under high pressure during spraying.

One difficulty with the use of such an accumulator is providing adequate lubrication for the sliding piston. It is important in this regard to avoid any substantial presence of lubricant in the expansible chamber containing the liquid to be sprayed, since this can contaminate the liquid. It has been known to provide accumulators in which lubricant is contained in the chamber representing the energy storing section. The piston is open to communicate with the energy storing section to effect lubrication of the seals on the piston. This, however, is not entirely satisfactory because it requires a large amount of lubricant and results in considerable dilution of the lubricant when it is spread throughout the entire energy storing section. These undesirable conditions are aggravated when the piston is moved entirely to the front of the accumulator to completely discharge the expansible chamber containing the liquid to be sprayed. In this circumstance, the chamber representing the energy storing section becomes almost the entirety of the pressure vessel. Such an arrangement runs counter to the goal of a self-contained lubricant adequate for long-term use.

OBJECTS OF THE INVENTION

It is accordingly an object of the invention to overcome the disadvantages and drawbacks of known accumulators for storing paint or other liquids to be sprayed.

It is a further object of the invention to provide an economical and simple system for long-term lubrication of the slideable piston in an accumulator for pressurized paint or other liquid to be sprayed.

It is a further object of the invention to provide for a long-term substantially self-contained supply of lubricant for a slideable piston in an accumulator for an airless spraying system.

It is a more particular object of the present invention to provide an accumulator for an airless spraying system in which the lubricant for the slideable piston of the accumulator is isolated both from the expansible chamber containing the pressurized fluid to be sprayed and from the energy storing section of the accumulator so that there is no communication between the space in which the lubricant is located, on the one hand, and the expansible chamber and energy storing section, on the other hand, so that the expansible chamber and energy storing are kept substantially free of lubricant.

Other objects, features and advantages of the present invention will become more apparent from the following description and from the accompanying drawings.

SUMMARY OF THE INVENTION

The foregoing objects, features and advantages are accomplished and provided by an accumulator for an airless spraying apparatus according to the present invention. The accumulator includes a pressure vessel, a piston slideably disposed in the pressure vessel and an expansible chamber partly defined by one side of the piston. The expansible chamber is for receiving, storing and discharging pressurized paint or other liquid. The accumulator also includes an energy storing section on the other side of the piston for storing energy from the expansion of the expansible chamber due to the introduction of a pressurized liquid into the expansible chamber and for releasing that energy when liquid is discharged from the expansible chamber to cause the expansible chamber to contract. The piston includes a first seal adjacent one of its sides and a second seal adjacent its other side, these two seals defining a lubricating space between them. The piston includes a plurality of inwardly extending passages therein, the passages opening into the lubricating space. The passages contain a supply of lubricant, which lubricant is permitted to flow into the lubricating space to lubricate the first and second seals. These lubricating passages provide for a long-term, self-contained supply of lubricant. The lubricating space is sealed and isolated from the expansible chamber and from the energy-storing section so that there is no communication between the lubricating space, on the one hand, and the expansible chamber and energy-storing section on the other hand. Thus, the expansible chamber and energy storing section are kept substantially free of lubricant.

DETAILED DESCRIPTION OF THE PREFERRED EMBODIMENT

Figure 1:
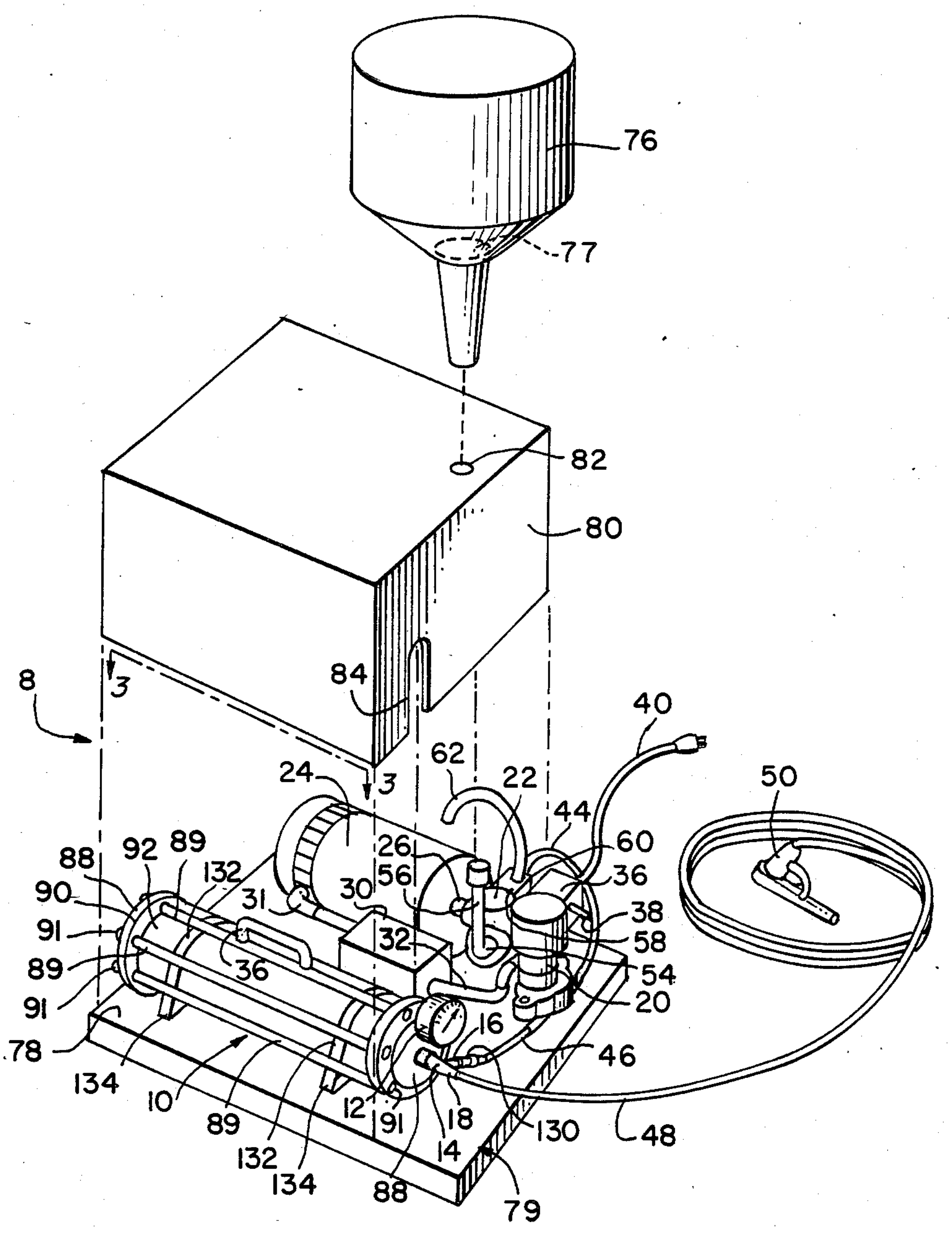
FIG. 1 is a perspective view of a spraying system according to the present invention.

Referring to FIG. 1, there is depicted a spraying system generally referred to by reference numeral 8.

This spraying system 8 includes a pressure accumulator vessel 10. Adjacent the front end of the accumulator 10 is a pressure gauge 12. Pressure gauge 12 is connected with a fluid coupling 14 which, in turn, communicates with the interior of the accumulator 10. Coupling 14 includes a first branch 16 through which pressurized paint or other liquid is introduced into the accumulator 10 and a second branch 18 through which pressurized paint or other liquid is discharged from the accumulator.

The spraying system 8 includes an automatic adjustable pressure switch 20 which is in communication with the accumulator 10, and specifically the first branch 16 of the coupling leading thereto. Settings on the adjustable pressure switch determine the upper and lower pressure limits for the pressurized paint or other liquid stored in the accumulator 10. Pressure switch 20 is generally of the type shown in U.S. Pat. Nos. 3,786,212 and 3,911,238. Upstream of pressure switch 20 is a power driven liquid pump 22. In an actual working embodiment, pump 22 is a "Hydro 1000 psi liquid pump" which is a piston- type pump. The pump is powered by a motor 24 which in the actual, existing embodiment is a one horsepower Dayton explosion-proof electric motor. Motor 24 drives pump 22 via shaft drive 26.

Motor 24 receives electrical power via water-tight electrical box 30 which encloses the required electrical connections. A power line 31 leads from box 30 into motor 24 and another power line 32 leads from pressure switch 20 to box 30. As already indicated, pressure switch 20 regulates the pressure in accumulator 10. It does so by selectively feeding electrical power to motor 24 through lines 31 and 32 via box 30 when the pressure in the accumulator falls below a given minimum. When the pressure level reaches the maximum as set on pressure switch 20, power to motor 24 will be cut off by the pressure switch 20.

Electrical power is fed to the pressure switch 20 via electrical on-off switch box 36. Box 36 contains a switch having a toggle arm 38 for turning the entire unit on and off. Power is supplied to box 36 via power supply cord 40.

It will be apparent that the accumulator 10, pressure switch 20 and pump 22 communicate with each other via hoses or conduits. Specifically, hose 44 connects pump 22 with pressure switch 20. Hose 46 connects pressure switch 20 with accumulator 10, and specifically with branch 16 of conduit 14 which leads into accumulator 10. An additional hose 48 leads to a spray gun 50 for effecting spraying of paint or other liquid. In an existing embodiment, hoses 44, 46 and 48 are all rated at 2700 psi and have a ¼ inch inside diameter. All of the couplings for the hoses, including aforementioned coupling 14 with its branches 16 and 18, are, in the existing embodiment, aircraft high-pressure connectors rated at 3500 psi.

Pump 22 has an inlet 54 to which is connected a liquid fill tube 56. It is through inlet 54 that paint or other liquid is introduced into the system. Pump 22 also has an outlet side 58, and outlet 58 is coupled to relief valve 60 from which extends tube 62. Relief valve 60 is provided for safety reasons to avoid excessive pressure build-up if, for instance, pressure switch 20 were to fail. In the existing embodiment, relief valve 60 opens at 1000 psi to prevent pressure build-ups over that amount. Of course, excess liquid which is bled off if the relief valve is actuated passes through conduit 62. Relief valve 60 guards against burnout of the pump 22 and/or motor 24 in the event of excess pressure build-ups.

Figure 2:
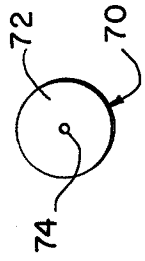
FIG. 2 is a front elevational view of a swirler containing a small orifice through which pressurized liquid is directed to effect spraying.

In the actual, existing embodiment, spray head 50 is a generally conventional DeVilbiss adjustable tip airless spray gun. The conventional gun is modified, however, to include a nozzle or spray orifice with a much smaller opening than that of the conventional spray gun. Specifically, the conventional DeVilbiss spray head 50 is fitted with a swirler 70 as shown in FIG. 2. Swirler 70 has a washer-like body 72 with a very small central orifice 74. In the existing embodiment, orifice 74 has a diameter of approximately 0.016 inch. In practice, it is expected that the desired performance can be obtained with orifices in the range of 0.010 inch and 0.025 inch.

Swirler 70 with its extra small orifice 74 creates a pressure build-up just upstream of itself in what is already a highly pressurized system. Specifically, with accumulator pressures in the range of 400 to 800 psi, pressure just upstream of the swirler 70 will be approximately at least 1000 psi. This high pressure and the attendant ultrahigh velocity of flow through the orifice 74 creates a finely atomized spray having a substantial positive electrical charge on the atomized particles without the need to impose an electrical charge through the use of electrical current or other application of external electrical power to the spray head. The positive charge on the finely atomized spray particles discharged from the gun 50, in turn, causes the particles to be attracted to the object to be painted or coated, which practically eliminates overspray and which permits complete coating of the object with much less paint or other liquid than would normally be required.

Reference numeral 76 refers to a hopper into which paint or other liquid may be poured. Hopper 76 connects with fill tube 56 to feed the paint or other liquid into the inlet side 54 of pump 22. Hopper 76 includes therein a filter 77 for filtering and straining the paint or other liquid fed into hopper 76.

The pump 22, its motor 24, the pressure switch 20, and the accumulator 10, as well as the components interconnecting these units, such as hoses 44 and 48, power lines 31 and 32, and electrical boxes 34 and 36, are all mounted on a base 78. Base 78 with these components thereon forms a pressure producing unit 79. As illustrated in FIG. 1, the spray head 50 may be remote from the pressure producing unit 79.

Pressure producing unit 79 may include a case 80, constructed of fiberglass, which surrounds many of the components of pressure producing unit 79 including accumulator 10, pump 22, motor 24, and electrical box 30. Case 80 is sized, however, so that, when case 80 is in place and in registry with base 78, the electrical on-off switch box 36 with its switch handle 38, the pressure switch 20 and the pressure gauge 12 will all be outside the case for easy access. Case 80 includes a slot 84 for accommodating the coupling 14 to effect communication with the interior of the accumulator 10 and an opening 82 which will be in registry with the fill tube 56 so that hopper 76 may be connected with fill tube 56 when case 80 is in place.

Figure 3:
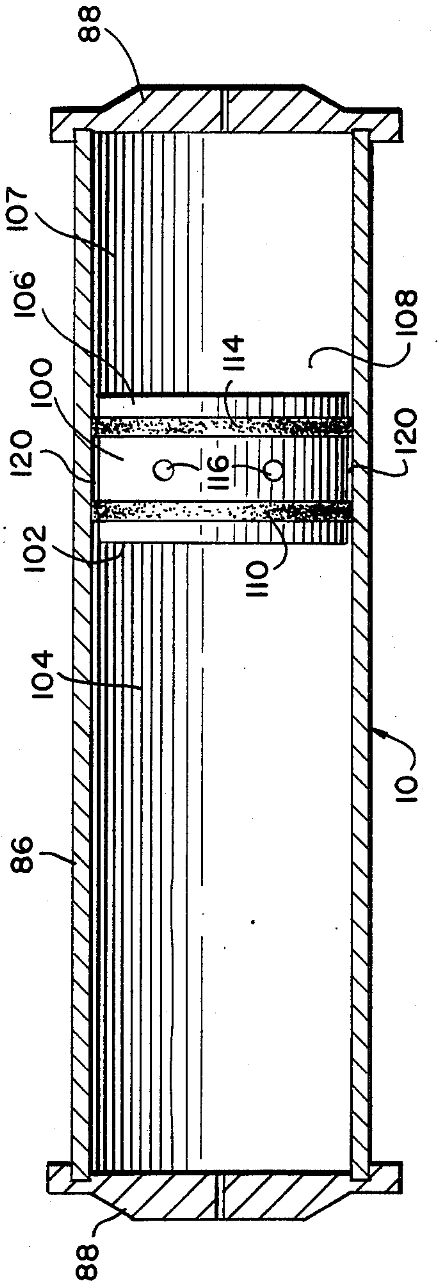
FIG. 3 is a partial sectional view taken on line 3—3 of FIG. 1 showing a section through the cylinder of the accumulator and showing the piston within the accumulator.
Figure 5:
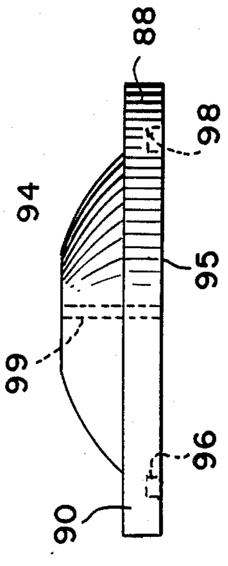
FIG. 5 is a side elevation of the cylinder head of FIG. 4.
Figure 4:
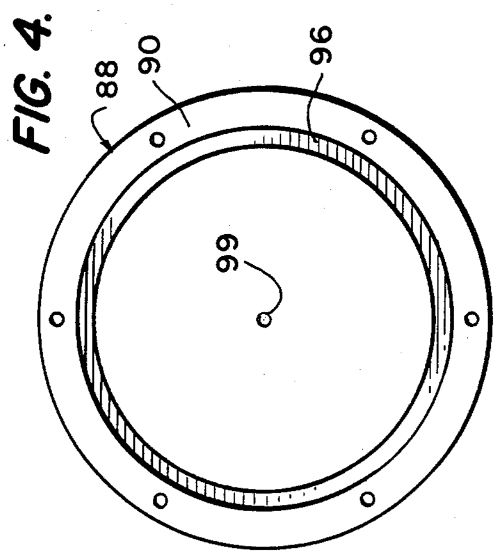
FIG. 4 is a plan view of the inside of a cylinder head which attaches to the cylinder of FIG. 3 to form the accumulator vessel.

Turning to FIGS. 3, 4 and 5, the accumulator 10 is constructed from an elongated cylinder 86. In the existing embodiment, cylinder 86 has a diameter of 4½ inches with walls which are ¼ inch thick. The walls are constructed of aluminum 6061 T6. At each end of cylinder 86 is a head 88 as shown in FIGS. 4 and 5. As with the cylinders, the heads 88 are constructed of 6061 T6 aluminum. They have thickness ranges from 0.5 inch to 0.6875 inch. The heads 88 are firmly held in place against the high pressures developed in the cylinder 86 by a set of longitudinally extending tie rods 89. Tie rods 89 are constructed of cold rolled steel No. 1215 and have a diameter of 0.375 inch. The tie rods 81 are anchored at each end in a flange 90 on each head. The rods are held in place on flange 90 by fasteners 91 which comprise star washers with grade 5 nuts in the existing embodiment. Together, the cylinder 86 with its heads 88 held in place by tie rods 89 and fasteners 91 form a pressure vessel referred to by reference character 92.

As seen in FIG. 5, each head has a dome portion 94 for added strength. The inner portion of the head, however, i.e., the portion facing the interior of the accumulator 10, has a flat surface. This allows a complete evacuation of all liquid from the cylinder and avoids any room in the head 88 for leftover liquid when the accumulator is to be exhausted of liquid.

Each head 88 includes a groove 96 just inwardly of the flange 90, yet near the periphery of the head. Groove 96 receives the ends of the cylinder 86 therein. Groove 96 includes a gasket 98 for sealing the heads 88 with respect to the cylinder 86. The material for the gasket will be either felt, Viton, neoprene or Thycol, depending upon the liquid to be introduced into the accumulator.

Each cylinder head 88 includes a bore 99 therethrough. In the existing embodiment, the bore 99 is a 0.35 inch threaded bore. In the cylinder head at the front of the accumulator, bore 99 is for receiving coupling 14 to allow fluid communication with the interior of the accumulator. In the head 88 at the rear of the accumulator as viewed in FIG. 1, the bore 99 will allow introduction of pressurized nitrogen gas to that side of the cylinder to be used for energy storing in a manner to now be described.

Figure 6:
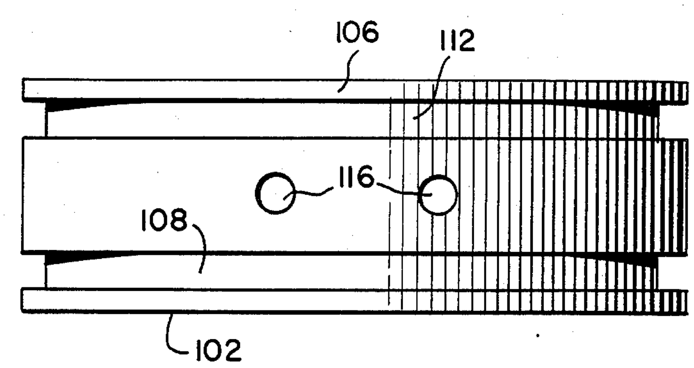
FIG. 6 is a side elevational view of the piston of FIG. 3.

In the interior of cylinder 86 is a slideable piston 100 which contributes to the energy storage function of the accumulator. Piston 100 includes a flat front side 102 partially defining an expansible chamber 104 for receiving pressurized paint or other liquid. Piston 104 also has a flat rear side 106 partially defining a chamber 107 which constitutes an energy storage section of the accumulator 10. That is, the chamber 107 constituting the energy storage section is charged with nitrogen gas under pressure. As pressurized paint or other liquid fills expansible chamber 104, it further compresses the nitrogen gas in section 107 until a desired pressure of paint or other liquid of approximately 800 psi in expansible chamber 104 is reached. As this pressurized liquid is discharged, the nitrogen gas in chamber 107 expands, releasing stored energy to provide a smooth constant pressure on the paint or other liquid being discharged and to ensure that the pressure of the paint or other liquid never drops below the desired minimum, in this instance about 400 psi. As will be apparent from the foregoing discussion and from the drawing, particularly FIG. 3, piston 100 is the only piston in expansible chamber 104, i.e., the chamber contains but a single piston 100. As is also apparent, particularly for FIG. 6, front side 102 and rear side 106 of piston 100 are rigidly and integrally joined to one another for movement together as a unit and, specifically, are of one piece.

Piston 100 includes a circumferential groove 108 (FIG. 6) adjacent the front side 102 of the piston. An O-ring seal 110 (FIG. 3) is disposed in groove 108. Similarly, piston 100 has, adjacent the rear side 106 thereof, a circumferential groove 112 (FIG. 6) in which an O-ring seal 114 (FIG. 3) is disposed. According to present designs, the grooves for the O-ring seals have widths of from $\frac{1}{8}$ inch to $\frac{3}{4}$ inch and depths of from 0.165 inch to 0.1875 inch. The O-ring seals 110, 114 may be constructed of Viton, neoprene or Thycol, depending upon the liquid to be sprayed.

Figure 7:
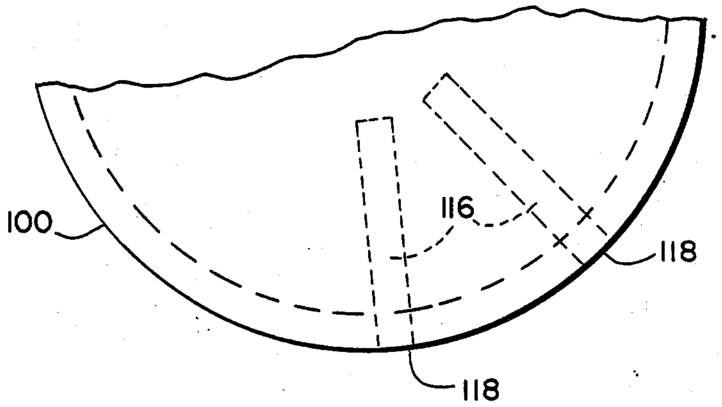
FIG. 7 is a fragmentary front elevation of the piston of FIG. 3 showing certain details thereof.

Piston 100 includes therein a series of radially inwardly extending cylindrical bores or passages 116 forming reservoirs for containing oil or another lubricant. The passages are elongated and extend inwardly for more than half the radius of the piston. For convenience, FIG. 7 illustrates only two such passages, but the passages extend entirely around the piston like spokes of a wheel. In the existing embodiment, the passages are cylindrical, and each has a diameter of 0.375 inch. It will be apparent that the lengthwise axes of the passages are larger than the diameter of the passages.

Each of the passages 116 opens into an annular lubricating space 120 between the piston 100 and cylinder 86, which lubricating space 120 is defined on its axial ends by seals 110, 114. The passages 116 defining lubricant reservoirs contain a supply of lubricant, preferably oil, therein, which lubricant is permitted to flow into lubricating space 120 to lubricate seals 110, 114. It will be apparent from the foregoing and from the drawing that each passage 116 is in the form of a blind hole which ends in the interior of the piston 100 such that, except where each passage 116 opens into lubricating space 120, which lubricating space surrounds piston 100, each passage 116 is isolated from every other inwardly extending passage within the piston 100, whereby each inwardly extending passage provides a separate reservoir of lubricant. Through the use of passages 116 forming lubricant reservoirs, a long-term, self-contained supply of lubricant is provided. Also, seals 110 and 114 as well as the construction of the piston ensure that the lubricant in lubricating space 120 and passages 116 is sealed and isolated from both the expansible chamber 104 for containing pressurized paint or other liquid and from the chamber constituting the energy storing section 107. That is, there is no communication between the lubricating space 120 and chambers 104 and 107. Thus, the expansible chamber 104 and chamber constituting the energy storing section 107 are kept substantially free of lubricant.

It will be seen that the spraying system 8 shown in the drawings and described herein is a relatively small compact and easily transportable system, particularly in view of the very high pressures which the system generates and handles. A contributing factor to this is the assembly of all the components of the system, except for the spray head and the hose leading to the spray head, into a single pressure producing unit 79 as shown in FIG. 1.

To further enhance the portability of the spraying system of the present invention, the accumulator 10 may be made readily releaseable from the overall pressure producing unit 79. This is accomplished by providing a quick disconnect coupling 130 on the branch 16 of coupling 14, which coupling, it will be recalled, effects communication with the interior of the accumulator 10. By actuating quick disconnect coupling 130 to effect release of the accumulator from hose 46 leading from pressure switch 20, the accumulator 10 is then in condition to be used independently of the remainder of the pressure producing unit 79, provided of course that the accumulator has previously been charged with pressurized paint or other liquid by use of the pressure producing unit 79. The accumulator 10 may be releaseably connected to the base 78 by straps 32 having releaseable latches 34. Releasing latches 34 frees the accumulator from the base and allows it to be carried via handle 136 to whatever object or objects are to be painted or otherwise sprayed.

In operation, when switch lever 38 is turned to the on position, motor 24 is energized to drive the pump 22. Pump 22 draws paint or other liquid from the fill tube 56 and perhaps also the hopper 76. Pressurized liquid leaving the pump passes through hose 44 and is directed to the pressure switch 20 which, in the existing embodiment, is set to continue providing power to motor 24 when the system is in an "on" cycle up to a maximum of approximately 800 psi, at which point the power to the motor is cut off. When the pressure later falls to approximately 400 psi, pressure switch 20 is set to reactuate motor 24 to drive pump 22 to raise the pressure again to 800 psi.

Liquid paint or other fluid is fed from pump 22, past pressure switch 20, through hose 46 into the accumulator 10 and specifically into the expansible chamber 104 thereof. The pressurized liquid is accumulated in the accumulator vessel 10 such that, after initial pressurization of the accumulator, the pressure in the accumulator is always approximately 400 psi or above during spraying. More specifically, as pressurized paint or other liquid is fed into expansible chamber 104, the piston 100 moves to the rear of the accumulator (i.e., to the right as viewed in FIG. 3) causing chamber 104 to expand and causing the nitrogen gas in the chamber defining energy section 107 to be compressed to store energy. The process continues until the pressure in chamber 104 reaches approximately 800 psi as sensed by pressure switch 20 and as reflected in the reading of pressure gauge 12. At 800 psi, pressure switch 20 cuts off the supply of electrical power to the motor 24, as already described.

Communication is effected between accumulator 10 and spray head 50, which head is located remotely from the power driven pump 22, by hose 48 along with coupling 14 and specifically branch 18 of that coupling. During spraying, the paint or other liquid is throttled through the small orifice 74 of the swirler 70. The swirler 70 with its small orifice 74 results in a local pressure of approximately at least 1000 psi at the upstream side of small orifice 74. Paint or other liquid is discharged through the spray head and directed toward an object to be painted or sprayed so that the object receives a coating of paint or other liquid via an airless spray. The passing of the paint or other liquid through the small orifice 74 under high pressure and at a very high velocity establishes a positive electrical charge on the paint or other liquid to be discharged through the nozzle, this charge being accomplished by the throttling of the liquid through the small orifice 74.

The accumulating of the pressurized paint or other liquid in the accumulator 10 includes isolating the pressurized paint from a lubricant which lubricates the sliding piston 100 within the accumulator 10. This is accomplished by confining the lubricant between one seal of the piston 110 which is adjacent a side of the piston 102 which faces the chamber 104 of the pressurized paint or other liquid and another seal of the piston 114, which other seal is adjacent a side of the piston 106 facing an energy storage section 107 of the accumulator 10. The hose or flexible conduit 48 allows the use of the spray head 50 in an area remote from the accumulator 10, which accumulator 10 is part of a pressure producing unit 79 which includes the power driven pump 22. As already indicated, portability of the unit may be enhanced by rendering the accumulator 10 readily detachable from the base 78 of the pressure producing unit 79. That is, the accumulator 10 may be removed from connection with the power driven pump via quick disconnect coupling 30, and the accumulator 10, hose 48 and spray head 50 may be transported to an area where painting is to be performed.

If painting is performed with the accumulator in place on the pressure producing unit 79, whenever the pressure of the paint or other liquid in expansible chamber 104 drops to approximately 400 psi, then the pressure switch 20 is actuated which will actuate the power driven pump 22 to reload the accumulator to approximately 800 lbs. as already described. Similarly, if the accumulator 10 has been detached from the pressure producing unit 79 to enhance the portability of the system and has been used at a remote location to such an extent that pressure in the expansible chamber 104 has dropped below approximately 400 psi, the accumulator 10 is reconnected to the pressure producing unit 79 and recharged in the manner just described.

During recharging, the nitrogen gas in energy storing section 107, which has been compressed further beyond its initial pressure by the movement of the piston 100 to the rear of the accumulator, then expands to help discharge the pressurized liquid from the accumulator 10 under a relatively steady pressure. When expansible chamber 104 is emptied of paint or other liquid, the nitrogen gas in section 107 forces the piston 100 to the extreme front of the accumulator to maintain an adequate pressure on the paint or other liquid even as the cylinder becomes nearly empty. That is, when the spray gun 50 is activated to release liquid, there will be a smooth, non-pulsating push exerted by the compressed nitrogen gas in section 107 even if the amount of paint or other liquid in chamber 104 is relatively small. As the piston 100 moves to the front of accumulator 10, it expands back to its original state, forcing all of the paint or other liquid out of chamber 104. With this arrangement, the spraying characteristics remain adequate and unchanged, regardless of the disposition of the spray gun 50. That is, spray gun 50 may be turned upside down or sideways without adversely affecting the spraying operation.

For charging the accumulator with paint or other liquid, the specific embodiment of the invention as disclosed herein shows the use of a hopper 76 into which paint or other liquid will be poured. In lieu of hopper 76, however, a hose or line may be run from fill tube 56 to an outside source of paint or other liquid, for instance, a 5 gallon drum, a 55 gallon drum or any other body of liquid, so as to make for a continuous feed.

The high-pressure but compact system of the present invention permits the use of much lower volumes of paint or other liquid to achieve the same results which would require higher volumes and much heavier, permanently installed equipment in conventional systems. In the system of the present invention, the operator need only handle the gun 50 which weighs about 1 lb., whereas, in a conventional airless spray system, the operator will be required to handle equipment weighing on the order of 12 lbs. The conventional system uses $\frac{1}{2}$ inch I.D. hose whereas, in the present system, $\frac{1}{4}$ inch I.D. hose may be used.

It is to be recognized that the apparatus, system and method of the present invention may be used in contexts other than as specifically described herein. The present invention may be used, for instance, in asbestos encapsulating processes to apply a hermetic seal to asbestos installations and reduce the dangers of such installations. The present invention may also be used in applying fireproofing materials. Further, it may be used in the context of high-pressure washers and for striping machinery for applying stripes or lines to roads or parking lots. The portable system may be particularly appropriate for riot control as a highly selective mace applicator. The very low volumes of liquid required and the ability to direct atomized liquid exactly where intended without overspray would be particularly useful in minimizing undesirable effects of the use of mace or the like. In this regard, the present invention could also be useful as part of a security system for protection of certain buildings or areas. The present invention may also be useful as a device for injecting materials, such as liquid fertilizers or pesticides, into sprinkler systems for facilitating application of such chemicals. Further, the accumulator of the present invention, if connected with a shaft or other means for obtaining mechanical power form the movement of piston 100 could be useful as a portable energy source, such as emergency jaws which are used by fire and rescue teams for spreading jammed doors to free trapped victims or to gain access to buildings.

While the present invention has been described in connection with a specific and preferred embodiment, it will, as already discussed, be understood that various different exemplary embodiments, variations and modifications are possible. That is, the invention is not limited by the particular exemplary embodiment shown and described, and the invention covers all other possible embodiments, variations and modifications within the scope of the appended claims.

What is claimed is:

1. An accumulator for an airless spraying apparatus, the accumulator comprising:

(a) a pressure vessel, (b) a single piston slideably disposed in said pressure vessel, (c) an expansible chamber partially defined by one side of said piston, which expansible chamber is for receiving, storing and discharging pressurized liquid, (d) an energy storing section on the other side of said piston for storing energy from the expansion of the expansible chamber due to the introduction of a pressurized liquid into the expansible chamber and for releasing that energy when liquid is discharged from the expansible chamber and the chamber contracts, (e) said piston including a first seal adjacent said one side of said piston and a second seal adjacent said other side of said piston, said first and second seals defining a lubricating space therebetween, said one side and said other side of said piston being rigidly and integrally joined to one another for movement together as a unit, (f) said piston including a plurality of inwardly extending passages therein, said passages opening into said lubricating space, (g) said passages containing a supply of lubricant therein, which lubricant is permitted to flow into said lubricating space to lubricate said first and second seals, whereby said lubricating passages provide for a long term self-contained supply of lubricant, (h) said lubricating space being sealed and isolated from said expansible chamber and from said energy storing section so that there is no communication between said lubricating space, on the one hand, and said expansible chamber and energy storing section on the other hand, whereby said expansible chamber and said energy storing section are kept substantially free of lubricant, (i) said inwardly extending passages being elongated and extending radially inwardly to provide a spoke-like pattern of lubricating passages in said piston, (j) each said inwardly extending passage being in the form of a blind hole which ends in the interior of said piston such that, except where each said inwardly extending passage opens into said lubricating space, which lubricating space surrounds said piston, each said inwardly extending passage is isolated from every other inwardly extending passage within said piston, whereby each said inwardly extending passage provides a separate reservoir of lubricant.

2. An accumulator as defined in claim 1, wherein said one side and said other side of said piston are of one piece.

3. An accumulator as defined in claim 1, wherein said inwardly extending passages are cylindrical and have lengthwise axes, said lengthwise axes being longer than the diameter of said passages.

4. An accumulator as defined in claim 1, wherein said inwardly extending passages extend radially inwardly for more than half the radius of said piston.

* * * * *